United States Patent Office 3,072,370
Patented Jan. 8, 1963

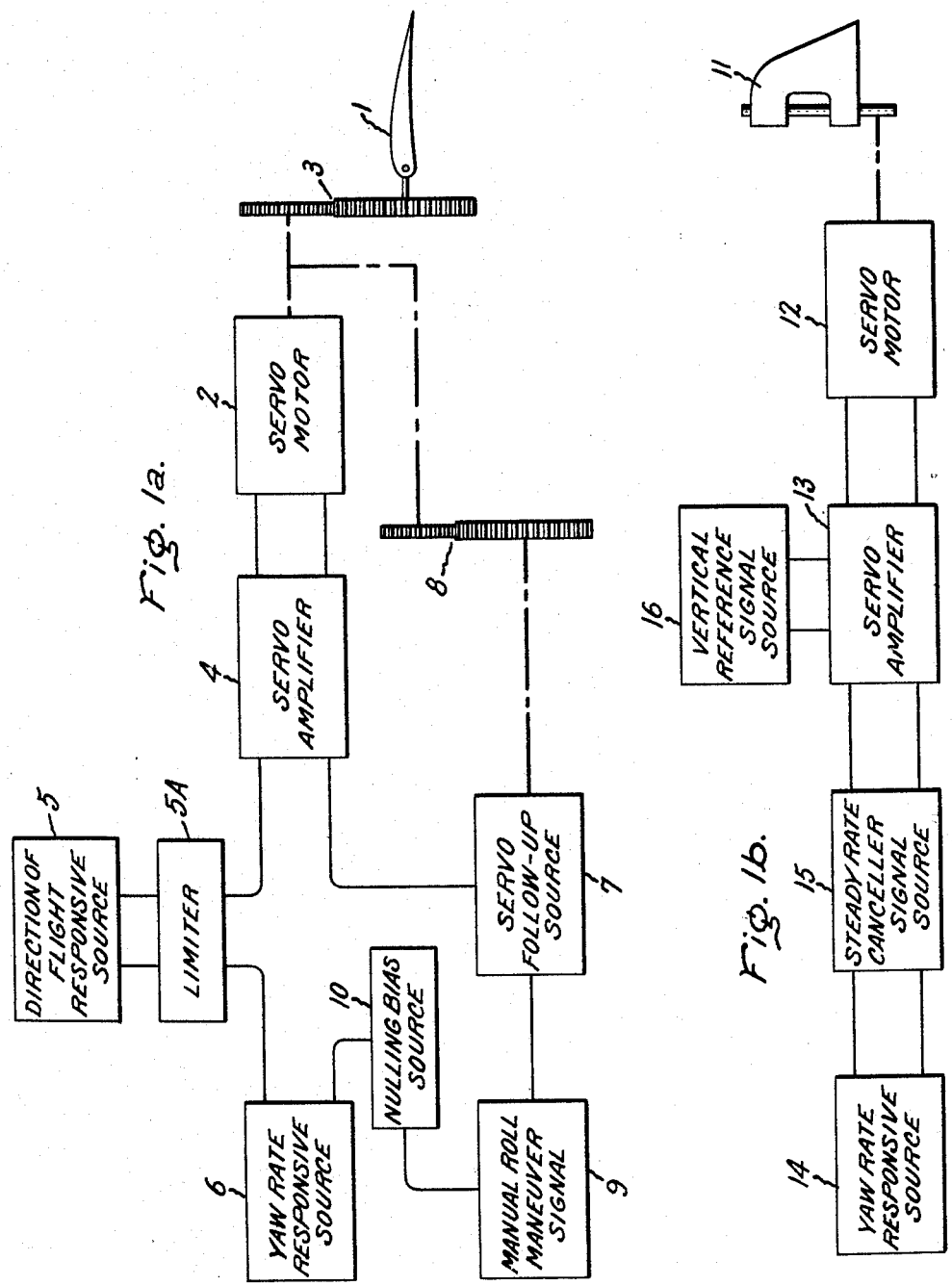

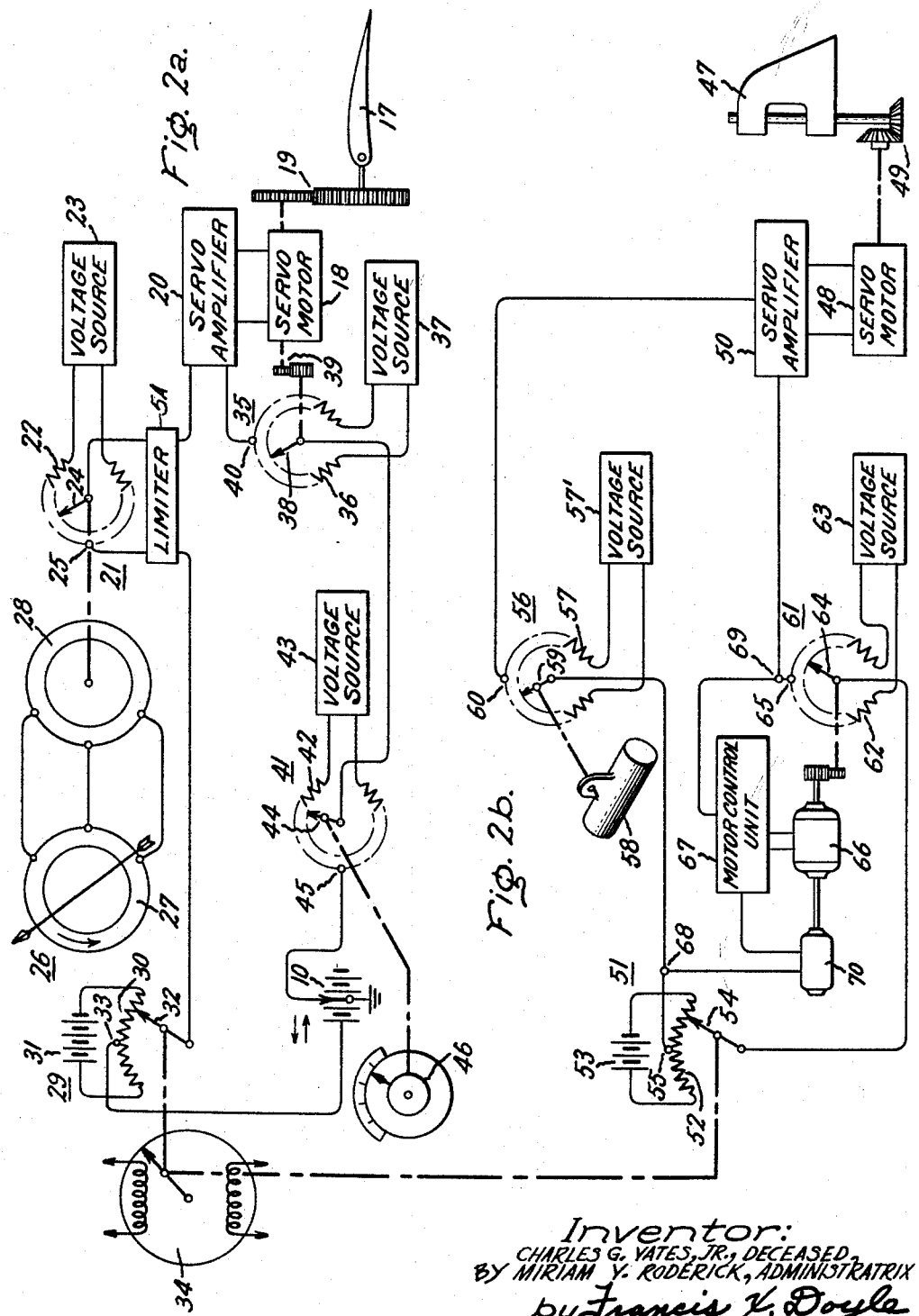

3,072,370
AUTOPILOT AIRCRAFT CONTROL APPARATUS
Charles G. Yates, Jr., deceased, late of Schenectady, N.Y., by Miriam Y. Roderick, administratrix, Scotia, N.Y., assignor to General Electric Company, a corporation of New York
Filed Nov. 16, 1959, Ser. No. 853,045
3 Claims. (Cl. 244—77)

This invention relates to automatic control apparatus for use in aircraft, and more particularly to apparatus for controlling the attitude of an aircraft relative to its longitudinal or roll axis, as well as its vertical or yaw axis.

In designing modern-day auto pilot systems, there are several principal factors which must ordinarily be considered. The standard of performance required of the apparatus and the innate reliability of the system in question are of course primary considerations.

In these systems a roll vertical gyro signal is normally required for stabilizing the roll channel, and a directional gyro signal is usually employed in stabilizing the heading of the aircraft. In order to maintain a predetermined compass course, it is necessary that the directional gyro be monitored by a compass derived signal. The required roll gyro position signal is commonly obtained from a vertical gyro which comprises a complex and intricate mechanical device incorporating a number of delicate gimbal assemblies. The directional gyro also requires the same type delicate gimbal assemblies. The compass correction required by a directional gyro is ordinarily obtained by mounting torque motors in conjunction with this unit and generating a signal from a compass transmitter element. However, in order to obtain the energy required to drive such torque motors, several stages of power amplification are essential. From the foregoing discussion, it will be appreciated that the need for gyros in auto pilots gives rise to a definite category of practical problems and that provision for an auto pilot system with the requirement for gyros eliminated would comprise a significant advance in the art.

Moreover, since each pound of control apparatus lessens the "pay load" of an aircraft, it is necessary that the weight of an auto pilot be kept as low as possible. On the other hand, the number of parts which may be eliminated must always be studied in the light of any possible loss of reliability which might be occasioned thereby.

In many prior art systems the production of a rugged simplified auto pilot with fewer or no gyros has not been accomplished without some resulting loss in quality control and reliability. It will thus be evident that one ultimate goal in the design of auto pilot systems is the production of an apparatus which is characterized not only by a minimum number of components and structural simplicity, but is also characterized by a very high degree of reliability.

Ordinarily, automatic pilots contain three control channels or circuits each of which is used for controlling the attitude of an aircraft relative to a different axis thereof. Since these channels are ordinarily electrically separate, the simplification and elimination of components which may be effected in any one channel can be accomplished without adversely affecting the performance of the other channels. Many prior art systems have recognized this fact by seeking to provide light weight control channels for aileron, elevator, and rudder control. The performance characteristics thus provided have been unsatisfactory in that the human pilot has ben obliged to trim the aircraft at frequent intervals in order to maintain the aircraft at the desired attitude. Because of the need for this type of constant monitoring, many simplified and uncomplex prior art control channels have failed to produce the optimum performance required from an auto pilot.

From the foregoing discussion, it will be appreciated that a great need exists at the present time for control channels which are capable of offering extreme reliability with a bare minimum of equipment and complexity. The present invention, therefore, contemplates a new auto pilot apparatus which exploits simple and reliable roll and yaw channels.

With the present invention, position gyro signals are completely dispensed with, without any attendant diminution in the reliability or trustworthiness of the auto pilot. By this means the price of effective auto pilot instrumentation is placed within the range of the owner of small personal and executive type aircraft. The present invention is similarly applicable to propeller and jet type airline transport ships, as well as to military jet aircraft.

Accordingly, therefore, a primary object of the present invention is to provide extremely trustworthy and uncomplex auto pilot equipment for use in maintaining an aircraft on a pre-determined compass heading.

Another object of the invention is to provide new and improved automatic pilot equipment for regulating the attitude of an aircraft relative to its longitudinal or roll axis.

Another object of the present invention is to provide novel circuitry and components for use in aerodynamically interdependent roll and yaw channels Another object of the invention is to disclose ingenious roll channel apparatus which eliminates the need for either a position roll signal or a rate of roll signal.

Another object of the invention is to provide aileron and rudder control channels in which the need for position gyros is entirely obviated.

A further object of the present invention is to disclose auto pilot equipment provided with means for obviating the effects of normal erratic compass operation by limiting the roll angle.

A further important object of this invention is to provide simple and reliable roll and yaw channel servo-loops in which rate responsive potentials are obtained by modification of the basic cockpit instruments found in any minimum instrumented aircraft.

A further object of the present invention is to disclose an improved auto pilot system in which a yaw rate signal is obtained from a linear pick-off potentiometer provided on a conventional turn and bank indicator.

A still further object of the invention is to provide an improved manually operable aileron control channel which in combination with an interdependent rudder channel automatically accomplishes coordinating turning of an aircraft upon actuation by a human pilot.

In carrying out the present invention in one aspect thereof, there is provided a direction of flight responsive signal generating means, yaw rate responsive signal generating means, and aileron follow-up signal generating means all of which combine to form a new and improved aileron control channel. In the inventive aileron control channel there is additionally provided a manual roll maneuver signal for allowing pilot actuated maneuvers, as well as a nulling bias source for adjusting the roll channel to a complete neutral condition. The several elements of the roll channel control the aileron by combining the various signals to actuate an aileron positioning means such as a servomotor. The roll channel of the present invention thus briefly described is intended for use with an interdependent rudder control channel and will be seen to use the same type of yaw rate signal employed therein.

The rudder control channel of the present invention includes a signal generating means of the pendulum type which responds to lateral acceleration or side slip of the craft. Through aerodynamic cooperation with this rudder control channel, the roll channel components act to stabilize the aircraft about its roll axis and the cooperation between the two channels acts to maintain the aircraft in the desired compass heading or azimuth.

In order to permit pilot actuated maneuvers, the aileron channel includes means for generating a manual roll maneuver signal.

The invention itself as to organization and mode of operation, together with additional objects and advantages thereof, may best be understood by referring to the following detailed description and drawings in which like numerals indicate like parts and in which:

FIGURE 1a is a simplified schematic diagram in block form of an auto pilot aileron control channel according to the present invention.

FIGURE 1b is a simplified schematic diagram in block form of an auto pilot rudder control channel which samples the same yaw rate error signal as the roll channel and acts in aerodynamic interdependence thereon.

FIGURE 2a is a diagrammatical representation of the auto pilot aileron control channel of the present invention and shows the components of FIGURE 1a in greater detail.

FIGURE 2b is a diagrammatical representation of the inventive rudder control channel which shows in greater detail the elements of the system illustrated in block form in FIGURE 1b.

Referring now to FIGURES 1a and 1b, the circuits illustrated therein act to provide aerodynamically interdependent auto pilot action for stabilizing an aircraft about its roll axis and maintaining it in a predetermined direction of flight. The aileron control channel in FIGURE 1a exploits a yaw rate signal received from a linear potentiometer pick-off associated with the turn and bank indicator and acts in cooperation with the rudder control channel depicted in FIGURE 1b. The rudder channel shown in FIGURE 1b also exploits a yaw rate signal received from a linear pick-off potentiometer provided on the turn and bank indicator, and forms in conjunction with the system of FIGURE 1a the combination of auto pilot circuitry and components sought to be protected by the claims of the present patent.

Referring more particularly now to FIGURE 1a, it will be noted that the ailerons 1 of an aircraft are connected to receive torque from a servomotor 2 by means of gears 3, so that displacement of such ailerons in either direction from a neutral position is possible. Such displacement is accomplished in response to movements of servomotor 2 in either direction from a corresponding null position. The servomotor 2 is connected to draw power from a servo amplifier 4.

The amplifier 4 receives energizing signals from a circuit which includes a plurality of separate signal sources connected in series relation. The first of these signal sources 5 produces a control signal in repsonse to any deviation of the aircraft from the direction of flight which the auto pilot has been set to maintain. For this reason, the block 5 has been identified as a direction of flight responsive source. The magnitude of the signal produced by the source 5 is proportional to the magnitude of the deviation from the desired heading, while the polarity of the signal is dependent upon the direction of the deviation. An example of such a direction of flight responsive source is a compass and selsyn system of the type referred to in greater detail later in the present specification.

The output potential from the source 5 is connected to a limiter 5A. The limiter 5A has a function of restricting the magnitude of the potential produced by source 5 to a value which limits the corrective tilting of the aircraft wings to a maximum of around three degrees bank angle. By this means the normal erratic motion of the compass is corrected for, and the tendency of the plane to overshoot the reference heading is markedly diminished.

The next signal source in the roll control channel comprises a yaw rate responsive source 6. This yaw rate responsive source acts to produce a signal which is variable in magnitude and polarity with the rate and direction of movement of the aircraft about its vertical or turn axis. The manner in which the yaw rate signal is derived from conventional turn and bank instrumentation will be explained more fully in connection with later portions of the present specification. It should be appreciated that provision for a yaw rate signal without resorting to additional complex gyros and the like adds substantially to the simplicity and reduction in weight afforded by the present invention.

In the aileron control channel, the sources 5 and 6 provide the primary signals for stabilizing the aircraft about its roll axis. However, in order to prevent hunting of the craft about the axis servo position a follow-up or repeat back feature is included in the channel. This takes the form of a servo follow-up source 7 which is connected to the servomotor 2 by means of a set of gears 8 in order to produce a signal proportional to the displacement of the ailerons from a predetermined neutral position. The signal thus generated by the follow-up source 7 is always of the polarity which tends to return the control surfaces to their neutral position.

In order to permit the manual maneuvering of the aircraft by the pilot, a manual roll maneuver signal source 9 is included in the roll channel circuit. By means of the potential from source 9, the auto pilot may be caused to effect a turn simply by introducing a voltage of appropriate magnitude and polarity into the roll channel. The interdependent yaw channel will, of course, simultaneously orient the rudder control surface of the airplane to assist in completing the banking maneuver initiated by the pilot.

Directly above the maneuver roll signal source, the reference numeral 10 has been used to identify a nulling bias source. The source 10 may take the form of a small adjustable bias potential suitable for introduction into the roll channel in order to cancel out any signals caused by improper nulling of the several signal devices in the roll channel circuitry. Such a bias adjustment may be advisable because of the reduced magnitude of the compass signal from source 5 which is available after the limiter 5A has acted upon the signal.

The stabilization of the aircraft about its roll axis by the improved aileron control channel is accomplished in cooperation with the interdependent rudder control channel illustrated in FIGURE 1b. Although the rudder control channel illustrated in FIGURE 1b exploits the same type of yaw rate signal as the roll channel, the channels are nevertheless electrically isolated, and influence each other only by virtue of their aerodynamic interdependence.

As shown in FIGURE 1b, the rudder channel accomplishes positioning of an aircraft rudder 11 by means of a servomotor 12. The servomotor 12 receives energizing potential from a servo amplifier 13 which is connected in a series circuit which includes a plurality of signal sources. The reference numeral 14 has been used in this circuit to designate a yaw rate responsive source which produces a signal variable in magnitude and polarity with the rate and direction of movement of the aircraft about its vertical or turn axis. As is explained in more detail in connection with FIGURE 2b, the source 14 comprises a small linear potentiometer pick-off on the turn and bank rate instrument.

To the right of the source 14, there is connected a steady rate canceller signal source, which may be of conventional construction, such as the one discussed in detail hereafter. The canceller signal source 15 produces an output signal in response to steady state or substantially non-transient signals. On the other hand, the steady rate canceller signal source produces no output signal when transient or non-steady state conditions tend to produce voltages in the rudder control channel of FIGURE 1b. The output potential produced by the signal source 15 in response to steady state signals is substantially equal and opposite to the signals produced by the other sources in the yaw channel by steady state signals. The potential thus generated is connected in series circuit relation in FIGURE 1b to oppose both the yaw rate signal and the vertical reference signal present at this time in the circuit.

The reference numeral 16 has been used in FIGURE 1b to identify a lateral acceleration signal source. The lateral acceleration source 16 produces a signal varying in magnitude and polarity with the amount and direction of lateral acceleration of the aircraft. The source 16 may comprise a conventional pendulum type side slip instrument which responds to gravitational or centrifugal acceleration. Such an instrument is mounted in the aircraft for pivotal movement about an axis parallel to or coincident with the longitudinal or roll axis of the aircraft and is responsive to centrifugal acceleration during turning or banking of the aircraft.

It has been stated earlier in the present specification that the aileron channel cooperates with the rudder channel to stabilize the aircraft about its roll axis and maintain the aircraft in a desired direction of flight. Such cooperation is secured through aerodynamic relationships because of the fact the roll and yaw channels are electrically isolated from each other. The use of a rate signal in each channel which is derived from the turn and bank rate indicator does not affect the complete lack of electrical interdependence between the channels. This means that each channel actuates the other channel by varying the position of the aircraft relative to the predetermined attitude which the last-mentioned channel has been adjusted to maintain.

The operation of the interdependent roll and yaw channels may be appreciated from the description of the following corrective sequence. In operation, when an air bump causes one wing of the aircraft to drop, the turn and bank indicator is caused to generate yaw rate signal because the wing down condition initiates a turn into the wing down direction. The lateral acceleration signal causes the yaw channel to effect maintenance of a zero side slip turn attitude. The turning action is, of course, also detected by the turn and bank indicator and the yaw rate signal generated by means of the pickoff is introduced into the roll channel of FIGURE 1a to actuate the servomotor in this roll channel. This sequence tends to raise the low wing and interrupt the turning motion. The wing level control function thus effected is similar to that provided by prior art roll channel systems.

In order to explain the maintenance of the aircraft on a predetermined azimuth or heading, it will be assumed that the aircraft compass is synchronized on the desired reference heading. Since the compass signal is connected into the roll channel, any deviation from the reference heading introduces a potential into the roll channel and initiates a bank attitude. This bank attitude results from commanding a yaw rate proportional to the magnitude of the limited compass signal introduced in the roll channel at the output terminals of the limiter 5A. The compass signal 5 thus limited may introduce a turning rate of (say) one-half degree per second. This turning rate continues until the compass signal is again nulled to indicate coincidence with the reference heading. The gradual rate of turn thus provided assures that the compass will follow the motion of the aircraft, and the lagging and overshooting of the compass which accompany extremely rapid rates of turn are obviated. It will be obvious to those skilled in the art that the maximum rate of turn permitted by the limited compass signal is readily established in flight tests and adjusted to optimum value.

Turning now from the block diagram of the roll and yaw channels to the details of the specific circuits, reference to FIG. 2a will now be made. In this figure there is illustrated a control surface 17 which represents the aileron element used by an aircraft for controlling the movements of the aircraft about its roll axis. In order to position the aileron 17 there is provided a reversible servomotor 18 which is connected to drive ailerons 17 through a set of gears 19. The servomotor 18 is energized from a servo amplifier 20 which in turn receives energizing potential from a plurality of signal sources connected in series circuit relationship. The resultant signal applied to amplifier 20 from this circuit is the algebraic summation of the individual potentials provided in the circuit. The servomotor 18 responds in direction to the polarity of the output signal of the servo amplifier and its speed is a function of the signal intensity.

In the upper portion of FIGURE 2a, the first of the signal sources 21 will be seen to include a potentiometer 22 which is connected across a voltage source 23 and has a wiper arm 24 which is movable in either direction along the potentiometer from coincidence with a fixed midtap 25. The output from source 21 is taken across arm 24 and tap 25 and thus varies in magnitude and polarity with the extent and direction of movement of the arm from coincidence with the tap. To the left of the signal source 21 the reference numeral 26 has been used to indicate generally a conventional aircraft compass. Deviations in azimuth detected by the compass are sensed by a compass selsyn 27. The direction responsive potentials produced by the compass are coupled to a synchronizing selsyn 28. Relative movement by the rotor of selsyn 28 is transmitted to the wiper arm 24 of signal source 21 by appropriate linkage means. In this way, deviations in the heading of the aircraft are transformed into uni-directional error signals of variable magnitude and polarity.

The error signals thus generated are applied to the limiter 5A shown directly beneath the source 21. The circuitry and components of limiter 5A are conventional and do not form a part of the specification or claims of the present invention. It will be recalled from the earlier portions of the detailed description that the limiter 5A has the function of restricting corrective wing banking to a maximum angle of around three degrees. In the roll channel another signal source in the left portion of the drawing is identified by the reference numeral 29. The source 29 includes a potentiometer 30 which is connected across a voltage source 31 and has a wiper arm 32 movable in either direction along the potentiometer from coincidence with a fixed midtap 33. The output from source 29 is taken across arm 32 and tap 33 and thus varies in magnitude and polarity with the extent and direction of movement of the arm from coincidence with the midtap. The potentiometer 30 used in signal source 29 comprises the linear potentiometer pick-off which is used in conjunction with the turn and bank indicator in the manner referred to earlier in this patent specification. Immediately to the left of the potentiometer 30 there is illustrated diagrammatically a conventional turn and bank indicator 34 with a movable element sensitive to turn and bank changes provided therein. The movable element within the indicator 34 is ganged to the wiper 32 on potentiometer 30 for simultaneous movement therewith. By means of this linear pick-off on conventional turn and bank rate instrumentation, there is provided a yaw rate signal which may be exploited in the roll channel as well as in the yaw channel of the present invention.

In order to prevent hunting or oscillation of the aileron control surface 17 in response to the potentials in the roll channel circuitry, it is necessary that an aileron position follow-up signal be introduced in the circuit. Such a signal is obtained in FIGURE 2a from the signal source 35 which includes a potentiometer 36 connected across a voltage source 37. The potentiometer wiper arm 38 is mechanically actuated by the aileron servomotor 18 through gears 39 so that its movement corresponds to that of the aileron control surface 17. The follow-up signal appearing between wiper arm 38 and the fixed midtap 40 is variable in magnitude and polarity depending upon the extent and direction of the movement of wiper arm 38 from coincidence of midtap 40. Follow-up signal source 35 is connected in the servo loop to oppose the control signals which cause displacement of aileron control surface 17. As ailerons 17 are displaced from their neutral position in response to signals in the roll channel circuitry, the source 35 thus acts to produce a signal in the channel which tends to return the ailerons to a neutral position.

In order to provide means for maneuvering the aircraft while it is under auto pilot control, the roll channel servo loop is provided with a manually operable maneuvering means. The manually operable means thus referred to includes a signal source 41. The source 41 includes a potentiometer 42 which is connected across a voltage source 43 and has a wiper arm 44 movable in either direction along the potentiometer from coincidence with a fixed midtap 45. The output from source 43 is taken across arm 44 and midtap 45 and varies in magnitude and polarity with the extent and direction of the movement of the arm from coincidence with the midtap. The wiper arm 44 may be caused to introduce a signal into the roll channel by means of a manually operable control knob 46 shown immediately to the left of the source 41. Under conditions of electrical balance in the circuit, the rotation of control knob 46 by the pilot results in the introduction of a signal from source 41 into the roll control channel. Because of the resulting actuation of the ailerons 17 and the interdependent signals initiated in the rudder control channel, the aircraft will be caused to describe a coordinated turn. The action effected by the rudder control channel in conjunction with the aileron control channel, thus has the effect of producing a turn in which the actual vertical axis of the aircraft coincides with the apparent vertical axis, i.e., with the resultant of the gravitational and centrifugal acceleration on the aircraft. The magnitude of the corrective signal derived in the yaw channel is, of course, dependent upon the deflection of the pendulum type lateral acceleration element, while the polarity is dependent upon the direction of movement experienced by this device.

In concluding the detailed description of the circuitry in FIGURE 2a, reference will be made to the nulling bias source identified by the reference numeral 10. The source 10 will be seen to take the form of a battery provided with a manually adjustable slider tap. Because of the possibility of erroneous off-null potentials occurring in the roll channel as a result of excessive vibration, or adverse temperature conditions within the several amplifiers and circuitry elements, it is sometimes advisable to provide some means for adjusting the roll channel to a perfect null. The nulling bias source 10 fulfills this function and makes possible a simple manual adjustment to a precise null, which eliminates any extraneous signals appearing in the channel.

Continuing with the detailed description of the invention and turning more particularly to FIGURE 2b, reference to the improved rudder control channel provided by the present invention will now be made. In this figure, the numeral 47 has been used to designate the rudder control surface of an airplane. The rudder 47 maneuvers the aircraft relative to its vertical axis by means of a reversible servomotor 48 which drives the rudder control surface 47 through gears 49. The servomotor 48 is energized by means of a servo amplifier 50 in response to signals supplied from a plurality of series connected signal sources in the same manner as servo amplifier 20 in FIGURE 2a. The first of these signal sources is identified by the reference numeral 51 in the extreme left-hand portion of FIGURE 2b. The source 51 provides a yaw rate responsive signal which is derived from a linear pick-off potentiometer 52 associated with the turn and bank indicator of the aircraft. The potentiometer 52 is connected across a voltage source 53 and has a wiper arm 54 movable in either direction along the potentiometer from coincidence with a fixed midtap 55. The output from the pick-off potentiometer 52 is taken across arm 54 and tap 55 and thus varies in magnitude and polarity with the extent and direction of movement of the arm from coincidence with the midtap. The wiper arm 54 is ganged to the movable element of the turn and bank indicator 34 to experience simultaneous movement therewith.

A second signal source 56 comprising a potentiometer 57 connected across a voltage source 57' is controlled by the movement of a centrifugal acceleration responsive device, such as the pendulum type side slip detector 58. The pendulum detector 58 comprises lateral acceleration signal source 16 referred to in connection with FIGURE 1b. This pendulum detector is mounted in the aircraft for pivotal movement about an axis parallel to or coincident with the roll axis of the aircraft, and is responsive to gravitational acceleration, as well as centrifugal acceleration during turning or banking of the aircraft. It will be appreciated that the pendulum detector 58 may be retarded by conventional damping means such as a dashpot or the like. The pendulum detector 58 is ganged to the wiper arm 59 of potentiometer 57. The wiper arm 59 is movable along potentiometer 57 on both sides of a fixed midtap 60, and the output of source 56 is taken between wiper arm 59 and tap 60.

During normal straight flight in an unbanked aircraft attitude, pendulum detector 58 coincides with the vertical axis of the aircraft and maintains wiper arm 59 on midtap 60. However, whenever the aircraft side slips or skids, the pendulum 58 moves off its null position to introduce a corrective signal into the rudder channel servo loop. Such a corrective signal moves the rudder to place the aircraft in a coordinated turn. The magnitude of this corrective signal is dependent upon the deflection of the pendulum detector 58, while the polarity is dependent upon the relative direction in which the detector moves.

In addition to the yaw rate signal source 51 and the pendulum side slip detector 56, the rudder control channel also includes a steady rate canceller signal source 61 which operates to substantially eliminate any steady state or non-transient signals produced by the source 51. The canceller source 61 comprises a potentiometer 62 which is connected across a voltage source 63 and has a wiper arm 64 movable in either direction from a fixed tap 65. The output signal from the source is taken between arm 64 and tap 65 and is thus dependent in polarity and magnitude upon the direction and magnitude of the displacement of arm 64 from tap 65.

The position of arm 64 is determined by the position of a motor 66 which is energized from a motor control unit 67 to rotate in either direction dependent upon the polarity of signals applied to control unit 67 and at a rate dependent upon the magnitude of the signals applied to unit 67. Control unit 67 is itself controlled by the signals appearing across points 68 and 69, which signals comprise the algebraic summation of the potentials produced by sources 51 and 61. This means that the motor control circuit samples the summation of the potentials from all the sources but the pendulum actuated vertical reference source 56. Accordingly, the conventional high impedance servo amplifier 50 is responsive in the usual manner to the algebraic sum of the instantaneous yaw transient signals from sources 51 and 56 and the steady state cancelling signal from source 61.

In order to make control unit 67 and thus canceller signal source 61 responsive only to non-transient signals, a generator 70 is included in the input circuit to control unit 67 in the manner described in Patent No. 2,582,305 for "Airplane Maneuvering System" and Patent No. 2,664,530, for "Autopilot Control System" both filed July 17, 1948, and assigned to the same assignee as the present invention. Generator 70 is placed in series with the input with motor control unit 67 so that the actual signal supplied to control unit 67 is the algebraic summation of the signal across points 68 and 69 and the output signal of the generator 70. Generator 70 is mechanically coupled with motor 66 to produce output signals varying in magnitude and polarity with the direction and rate of motor motion and it is degeneratively connected with respect to the signal across points 68 and 69. In other words, the output of generator 70 is connected in series opposition to the signal applied from points 68 and 69.

Assuming that substantially steady state signals appear across points 68 and 69, motor 66 is thereupon caused to move at a rate and in a direction dependent upon the magnitude and polarity of these signals. Motion of motor 66 not only rotates generator 70 so that it produces a signal, but also displaces wiper arm 64 so that source 61 produces a signal. In the resulting sequence of operations, motor 66 begins to move at a rate proportional to the signal across points 68 and 69, and then decelerates as the outputs from generator 70 and signal source 61 oppose the actuating signal. The output from source 61 is connected serially in the servo circuit to reduce the signal across points 68 and 69, while the output of the generator 70 is applied solely in the energizing circuit for control unit 67 which causes only a portion of the aforesaid reduced signal to be supplied to control unit 67. When motor 66 moves arm 64 to a position where the signal output from source 61 is equal and opposite to the signal from source 51, the voltage across points 68 and 69 goes to zero and the motor stops rotating. Essentially complete cancellation of steady state signals from the yaw rate source 51 is thus obtained after a time interval dependent upon the original amplitude of the input signal and the output characteristics of source 61 and generator 70.

However, when the signal of source 51 is varying rather rapidly in the manner of transient signals, cancellation is negligible or extremely slight because of the generator characteristics and because of the inability of the motor and associated equipment to respond to rapidly varying control signals. Consequently, transient signals from source 51 are impressed upon the input of amplifier 50 much as if the steady state canceller signal source 61 were not in the system.

In the operation of maintaining an aircraft on a constant azimuth or heading, the operation of the aerodynamically interpendent roll and yaw channels explained in detail above is as follows: When the left wing of the aircraft is dropped in bumpy air, a turning to the left is indicated, with resulting generation of an opposing signal from the linear pick-off of the turn and bank indicator. Such signal will initiate a roll to the right, and as a result of rolling to the right, the rate of turn to the left is decelerated. As the turn rate decreases in this fashion and goes to zero, the wings of the aircraft are restored to a level attitude. The signal from the turn and bank indicator consequently disappears and the airplane is allowed to steady out with no tendency for overshooting in the opposite direction.

If an error in heading has developed during this interval, the compass introduces a signal into the roll channel circuitry by means of limiter 5A. Such a signal corrects the banking of the wings up to angles of around three degrees or so, and the airplane as thus banked up begins to return to the reference heading. As the heading is approached, the rate signal from the turn and bank indicator pick-off opposes the compass signal. The compass signal decreases in magnitude, which decreases the turning rate and banking angle of the aircraft and causes a smooth approach to the new heading which returns all signals to zero magnitude. Any tendency for the aircraft to overshoot the heading angle is effectively eliminated by this sequence of corrective actions. Although the stability gradients of the servo loops are somewhat different for different velocities of the aircraft, adjustment of the various gradients is readily accomplished to ensure stability throughout the speed ranges encountered in either propeller aircraft or jet aircraft.

While the various signal sources included in the roll and yaw control channels of the invention have been illustrated and described as potentiometer type sources, it should be appreciated that selsyn type inductive instruments of the type shown 2,464,629—Young, may be substituted for the potentiometer units if desired. Moreover, where potentiometers are used, the voltages shown may be D.C. or A.C., and in practice, a common source connected to each potentiometer through a transformer may be used if A.C. sources are employed in practicing the invention.

What is claimed is:
1. A simplified autopilot control system for stabilizing an aircraft comprising:
 (a) a first electrically isolated control channel automatically responsive to yaw rate and heading information for positioning a roll control surface such as an aileron including,
  (1) first signal responsive actuating means connected to move said roll control surface,
  (2) first means for generating a signal proportional to the rate of movement of said aircraft about the yaw axis thereof,
  (3) compass means for generating a signal proportional to the deviation of said aircraft from a predetermined reference heading,
  (4) follow-up means for generating a signal in response to displacements of said roll control surface from a predetermined neutral position,
  (5) means coupling said signals to energize said first signal responsive actuating means; and (6) said channel not including a vertical gyro, a heading gyro, or a roll rate measuring instrument;
 (b) a second electrically isolated control channel for positioning a yaw control surface such as a rudder in such a manner that said first and second control channels interact to stabilize said aircraft in roll and yaw through the aircraft aerodynamic characteristics including,
  (1) second signal responsive actuating means connected to move said yaw control surface,
  (2) second means for generating a signal proportional to the rate of movement of said aircraft about the yaw axis thereof,
  (3) means for producing a bank attitude signal in response to the departure of the apparent vertical of said aircraft from the true vertical thereof,
  (4) means coupling said bank attitude and yaw rate signals to energize said second actuating means.
2. A simplified autopilot control system for stabilizing an aircraft comprising:
 (a) a first electrically isolated control channel automatically responsive to yaw rate and heading information for positioning a roll control surface such as an aileron including,
  (1) first signal responsive actuating means connected to move said roll control surface,
  (2) a turn and bank indicator,
  (3) first means responsive to said turn and bank indicator for generating a signal proportional to the rate of movement of said aircraft about the yaw axis thereof,
(4) compass means for generating a signal proportional to the deviation of said aircraft from a predetermined reference heading,
(5) follow-up means for generating a signal in response to displacements of said roll control surface from a predetermined neutral position,
(6) means coupling said signals to energize said first signal responsive actuating means; and (7) said channel not including a vertical gyro, a heading gyro, or a roll rate measuring instrument;

(b) a second electrically isolated control channel for positioning a yaw control surface such as a rudder in such a manner that said first and second control channels interact to stabilize said aircraft in roll and yaw through the aircraft aerodynamic characteristics including,
(1) second signal responsive actuating means connected to move said yaw control surface,
(2) second means responsive to said turn and bank indicator for generating a signal proportional to the rate of movement of said aircraft about the yaw axis thereof,
(3) means for producing a bank attitude signal in response to the departure of the apparent vertical of said aircraft from the true vertical thereof,
(4) means coupling said bank attitude and yaw rate signals to energize said second actuating means.

3. A simplified autopilot control system for stabilizing an aircraft comprising:
(a) a first electrically isolated control channel automatically responsive to yaw rate and heading information for positioning a roll control surface such as an aileron including,
(1) first signal responsive actuating means connected to move said roll control surface,
(2) a turn and bank indicator,
(3) first means responsive to said turn and bank indicator for generating a signal proportional to the rate of movement of said aircraft about the yaw axis thereof,
(4) compass means for generating a signal proportional to the deviation of said aircraft from a predetermined reference heading,
(5) follow-up means for generating a signal in response to displacements of said roll control surface from a predetermined neutral position,
(6) means coupling said signals to energize said first signal responsive actuating means,
(7) limiter means for restricting said signal produced by said compass means to a preset level; and (8) said channel not including a vertical gyro, a heading gyro, or a roll rate measuring instrument;

(b) a second electrically isolated control channel for positioning a yaw control surface such as a rudder in such a manner that said first and second control channels interact to stabilize said aircraft in roll and yaw through the aircraft aerodynamic characteristics including,
(1) second signal responsive actuating means connected to move said yaw control surface,
(2) second means responsive to said turn and bank indicator for generating a signal proportional to the rate of movement of said aircraft about the yaw axis thereof,
(3) pendulum means for producing a bank attitude signal in response to the departure of the apparent vertical of said aircraft from the true vertical thereof,
(4) means coupling said bank attitude and yaw rate signals to energize said second actuating means.

References Cited in the file of this patent
UNITED STATES PATENTS

| | | |
|---|---|---|
| 2,705,116 | Yates et al. | Mar. 29, 1955 |
| 2,827,249 | Glaus | Mar. 18, 1958 |
| 2,870,979 | Tribken et al. | Jan. 27, 1959 |
| 2,881,990 | Kutzler | Apr. 14, 1959 |
| 2,893,662 | Noxon | July 7, 1959 |
| 2,896,883 | Andeen | July 28, 1959 |